United States Patent [19]

Himuro et al.

[11] Patent Number: 4,937,602
[45] Date of Patent: Jun. 26, 1990

[54] CONTROL DEVICE FOR DRIVING ZOOM LENS OF CAMERA

[75] Inventors: Keiji Himuro; Shigeru Mitsu, both of Tokyo, Japan

[73] Assignee: Ricoh Company, Ltd., Tokyo, Japan

[21] Appl. No.: 304,036

[22] Filed: Jan. 31, 1989

[30] Foreign Application Priority Data

Feb. 1, 1988 [JP] Japan .................................. 63-19573

[51] Int. Cl.⁵ ............................................. G03B 5/00
[52] U.S. Cl. ............................................... 354/195.1
[58] Field of Search ................ 354/195.1, 400, 195.12; 350/429, 430

[56] References Cited

U.S. PATENT DOCUMENTS 3,834,796  9/1974  Komine ............................. 350/429
4,496,229  1/1985  Ogasawara ......................... 354/400

Primary Examiner—W. B. Perkey
Attorney, Agent, or Firm—Oblon, Spivak, McClelland, Maier & Neustadt

[57] ABSTRACT

A drive control device for controlling a zoom lens of a camera comprising: a zoom lens arranged on an optical axis; a motor for driving the zoom lens; a first controller for controlling a first zooming function wherein the zoom lens is moved at a relatively slow normal speed; a first trigger for starting the first zooming function only when the first trigger is being manipulated. The device further comprises a focal distance detector for detecting the position of the zoom lens on the optical axis; a first detector which detects a longest distance state wherein the zoom lens is positioned at a maximum focal point; a second detector which detects a shortest distance state wherein the zoom lens is positioned at a minimum focal point and which outputs a signal of the minimum focal position corresponding to the shortest distance state; a second controller for controlling a second zooming function of the camera wherein the zoom lens is moved at a speed far fastener than the normal speed by the motor; and a second trigger for starting the second zooming function. When the second trigger is manipulated, the zoom lens is automatically driven to move to the maximum focal position or to the minimum focal position irrespective of the length of the manipulation time of the second trigger.

6 Claims, 4 Drawing Sheets

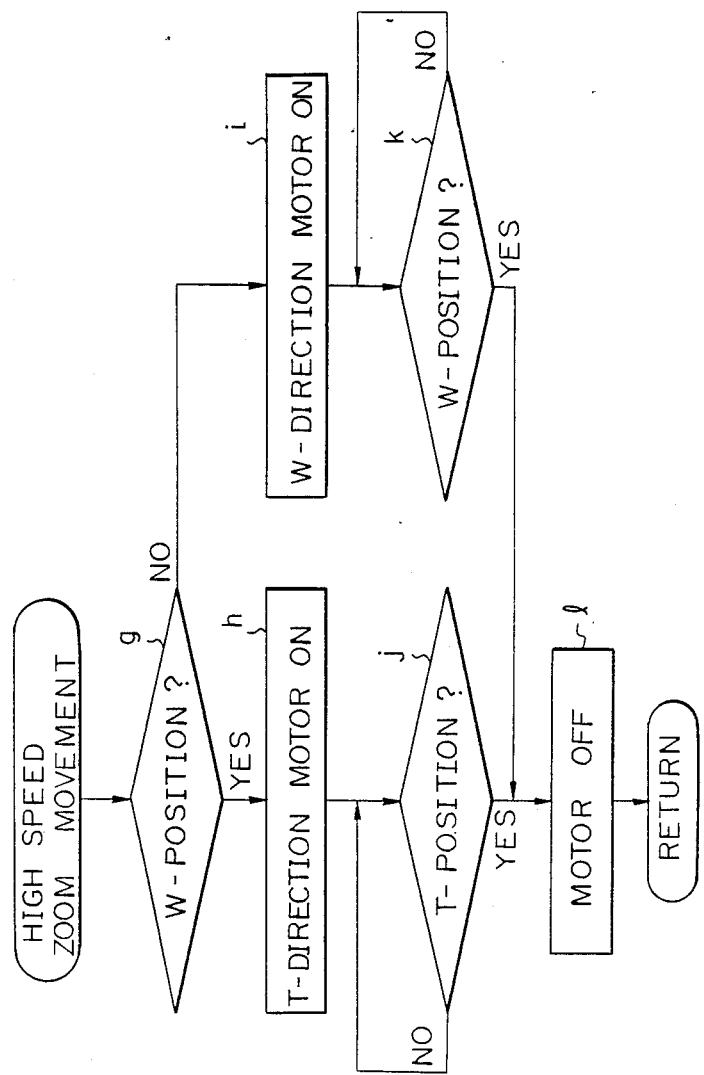

CONTROL DEVICE FOR DRIVING ZOOM LENS OF CAMERA

BACKGROUND OF THE INVENTION

The present invention relates to a drive control device for controlling a zoom lens of a camera. More particularly, the invention relates to a drive control device for controlling a zoom lens of a camera comprising: a zoom lens assembly comprising zoom lenses arranged on an optical axis; a drive means comprising a motor for driving the zoom lenses along the optical axis; a first control means for controlling a first zooming function of the camera wherein the zoom lenses are moved at a relatively slow normal speed to continuously change the focal point of the zoom lens assembly; and a first trigger means for carrying out the first zooming function only when the drive means is being manipulated.

Various kinds of electrically driven electronic cameras have been developed and commercialized. With such an electronic camera, a user can set the focus point of the zoom lens on an object positioned at any distance from the longest distance to the shortest distance only by manipulating buttons of the camera. Therefore, the user can easily compose an image of the picture as desired by viewing the field through a finder of the camera. The prior art camera is constructed in such a way that a zooming function is continued as long as the user presses a zoom button for starting the zooming function and changing focal length of the zoom lens and stopped when the button is released. In other words, the user manipulates the zoom button while viewing an object to be taken as a subject of the picture through the finder, the size of the object through the finder being continuously changing. The user stops the manipulation of the button when the size of the object (or composition) becomes as desired. For this purpose, the drive motor must drive the zoom lens at a relatively slow speed enabling the user to view and judge the optical zoom position of the object. Also, the zoom focusing movement must immediately stop when the composition or the angle of field becomes as desired without overrunning. From this point, the drive motor must drive the zoom lens at a relatively slow speed.

However, in some cases depending on the object of the photograph, the user requires the composition image of only the longest focal distance (referred to as "teleposition" below) or the shortest focal distance (referred to as "wide position" below) without requiring the continuous change of the angle of field in the range of intermediate distance. Also, in this case, the user requires the zoom lens be changed quickly as possible from the teleposition to the wide position and vice versa. One of such cases is, for example, when a scenery of fireworks is to be taken as a subject of the picture wherein the cameraman wishes to take an entire scenery of the fireworks and zoomed shots of parts thereof as well before the fireworks are extinguished. In such a case, with the prior art camera which zooms the object at a slow speed, the timing of taking a shot is often late so that a desired shutter chance is missed or a desired composition can not be obtained.

Also, a skilled person often uses the camera as a two focal point camera in which he or she uses only the teleposition and the wide position and in which the teleposition image and the wide position image are repeatedly changed for confirmation of the effect of the zoomed image. In such a case, it is desirable that the teleposition image and the wide position image are quickly changed. However, with the prior art zoom lens system, the zooming movement is slow so that the user must wait for some time until the image is changed manipulating the zoom switch (usually pushing the zoom button).

On the other hand, for a person who is not skilled in manipulating the zoom camera, it is troublesome to manipulate the zoom switch for functioning the zoom lens system so that the zoom lens system is not fully mastered and handled.

SUMMARY OF THE INVENTION

The present invention was made considering the above mentioned problems of the prior art. It is therefore an object of the present invention to provide a control device for driving a zoom lens system of a camera which makes it possible to heighten the speed of the zooming movement without impairing the functional ability of the zoom lens system thereof.

The object of the present invention can be achieved by a drive control device for controlling a zoom lens of a camera comprising: a zoom lens arranged on an optical axis; a drive system comprising a motor for driving the zoom lens along the optical axis; a first control system for controlling a first zooming function of the camera wherein the zoom lens is moved at a relatively slow normal speed to continuously change the focal point of the zoom lens; and a first trigger system for carrying out the first zooming function only during the time when the first trigger system is being manipulated, wherein the device further comprises: a focal distance detection system for detecting the position of the zoom lens on the optical axis, the position corresponding to the focal distance thereof; a maximum focal distance detection system for detecting that the zoom lens is positioned at a position corresponding to the longest focal point on the optical axis and emitting an output signal of the maximum focal distance; a minimum focal distance detection system for detecting that the zoom lens is positioned at a position corresponding to the shortest focal point on the optical axis and emitting an output signal of the minimum focal distance; a second control system for controlling a second zooming function of the camera wherein the zoom lens is moved at a speed far faster than the normal speed by the motor to the maximum focal position or the minimum focal position and stopped upon receipt of the output signal of the maximum focal distance or the minimum focal distance; and a second trigger system for starting the second zooming function and being able to be manipulated from outside, wherein the device is characterized in that when the second trigger system is manipulated, the zoom lens is automatically driven to move to the maximum focal position or to the minimum focal position irrespective of the length of the manipulation time of the second trigger system.

An advantage of the above mentioned device is that the focal distance is quickly changed to the maximum focal distance or to the minimum focal distance by a simple manipulation of the second trigger system to start the second zooming function without impairing the first zooming function.

Further objects and advantages of the present invention will be apparent from the following description of the preferred embodiments of the invention as illustrated in the accompanying drawings.

BRIEF DESCRIPTION OF THE DRAWINGS

FIG. 4 is a still another flow chart of a function of the embodiment of FIG. 1, representing a high speed zooming function which is a primary feature of the present invention.

DESCRIPTION OF THE PREFERRED EMBODIMENTS

An embodiment of the present invention is described hereinafter with reference to the accompanying drawings.

Figure 1:
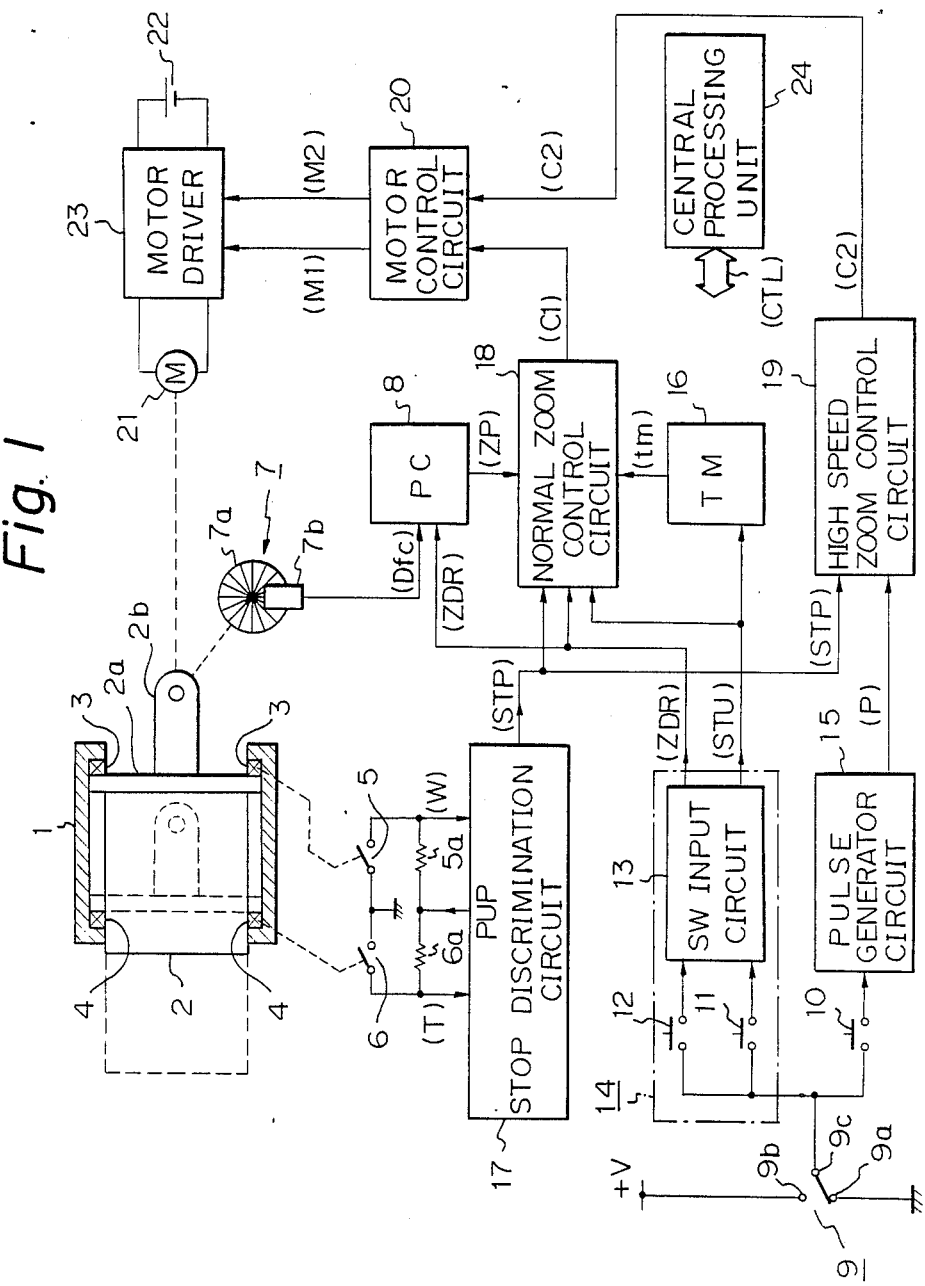
FIG. 1 is a block diagram of an entire construction of an embodiment of the control device for driving a zoom lens of a camera in accordance with the present invention.

FIG. 1 is a block diagram of an entire construction of an embodiment of the control device for driving a zoom lens of a camera in accordance with the present invention.

In FIG. 1, numeral 1 designates a stationary barrel secured to an immovable portion (not shown) of a camera (not shown) and arranged in parallel with an optical axis of the camera. Numeral 2 designates a movable barrel which supports a zoom lens (not shown) on the optical axis and which is disposed in the stationary barrel 1 and movable therein in the rightward and leftward directions in the drawing. A flange 2a is attached to a rear end of the movable barrel 2. A drive arm 2b for driving the movable barrel 2a is secured to a rear side of the flange 2a. Numeral 3 designates a stop ring disposed at a rear end of the stationary barrel 1. The rear end of the stationary barrel represents the shortest focal position of the zoom lens and corresponds to the minimum focal distance thereof. The position of this rear end is referred to as a W-position hereinafter. Numeral 4 designates another stop ring disposed at a forward end of the stationary barrel 1. The forward end of the stationary barrel represents the longest focal position of the zoom lens and corresponds to the maximum focal distance thereof. The position of this forward end is referred to as a T-position hereinafter. The movable barrel 2 is constructed in such a way that the flange 2a abuts against the W-position stop 3 to stop the barrel 2 at the W-position as illustrated in solid lines, and that on the other hand the flange 2a abuts against the T-position stop 4 to stop the barrel 2 at the T-position as illustrated in dash lines.

Numeral 5 designates a W-position detection switch which is closed to be turned on when the movable barrel 2 is positioned at the W-position and outputs a positional signal (W) as a minimum focal position signal. Numeral 6 designates a T-position detection switch which is closed to be turned on when the movable barrel 2 is positioned at the T-position and outputs a positional signal (T) as a maximum focal position signal.

Numeral 7 designates a focus counter used as a means for detecting the focal length. The focus counter 7 comprises a slit disc plate 7a and a photointerrupter 7b. The slit disc plate 7a is driven to rotate according as the movable barrel 2 is driven to move. The photointerrupter 7b outputs a pulse signal (Dfc) of a frequency in response to the rotational movement of the slit disc plate 7a.

Numeral 8 designates a pulse counter which receives the pulse signal (Dfc) output from the photointerrupter 7b and a zoom direction signal (ZDR) which is described later and functions in such a way that when the zoom direction signal is at a level L, the counter 8 outputs a count number (ZP) which is incremented by one in response to one pulse and that on the other hand when the zoom direction signal is at a level H, the counter 8 outputs a count number (ZP) which is decremented by one in response to one pulse. In this particular embodiment, the counter is arranged in a manner that ZP is zero when the movable barrel 2 is at the W-position while ZP is 255 when the movable barrel 2 is at the T-position.

Numeral 9 designates a switch for driving to open and close a lens barrier (not shown) which openably covers a forward side of the shot lens (not shown) of the camera. The switch 9 comprises three contacts 9a, 9b and 9c. The contact 9a is for opening the lens barrier and grounded to the earth. The contact 9b is for closing the lens barrier and connected to a electric power +V. The contact 9c is a common contact. The common contact 9c is connected to three push button switches 10, 11 and 12 each of which can be manipulated from outside. The push button 10 is for starting a high speed movement of the zoom lens. The push button 11 is for driving the movable barrel 2 toward the W-position. The push button 12 is for driving the movable barrel 2 toward the T-position. The W-positioning push button switch 11 and the T-positioning push button switch 12 are connected to a switch input circuit 13 which is arranged in such a way that when the W-positioning switch 11 is pressed the signal is reversed to the level H which is being maintained during the switch 11 is pressed whereas when the T-positioning switch 12 is pressed the signal is reversed to the level L which is being maintained during the switch 12 is pressed. These W-positioning signal and T-positioning signal constitute the zoom direction signal (ZDR) output from the switch input circuit 13. The switch input circuit 13 also outputs a status signal (STU) which is raised to the level H when one of the push button switches 11 and 12 is pressed to be turned on, while lowered to the level L when the switch is released to be turned off. This switch input circuit 13, the W-positioning push button switch 11 and the T-positioning push button switch 12 constitute a first zoom trigger circuit 14 which starts a normal zooming movement.

The high speed zoom switch 10 is connected to a pulse generator 15 which is arranged in such a way that one pulse (P) is output therefrom each time the high speed zoom switch 10 is pressed irrespective of the period wherein the switch is being pressed. The pulse generator 15 and the high speed zoom switch 10 constitute a second zoom trigger circuit which starts a high speed zooming movement.

Numeral 16 designates a timer circuit which, for example, is set to function with a period of 10 ms and receives the status signal (STU) so that the time count function thereof is triggered to start by an edge of a rising portion of the status signal and a time up signal (tm) is output at every 10 ms.

Numeral 17 designates a stop timing discrimination circuit which raises a signal output from a pull up terminal PUP to the level H and after that reads the positional signals (T) and (W) and which outputs the data of the positional signals and a stop signal (STP). Numeral 18 designates a first-zoom control circuit for controlling the drive motor which is described later to move at a normal speed which is relatively slow by a control signal (C1) on the basis of the stop signal (STP), the zoom direction signal (ZDR), the status signal (STU), the count number (ZP) and the time up signal (tm).

Numeral 19 designates a second zoom control circuit for controlling the drive motor at a speed far faster than the normal speed by a control signal (C2) on the basis of the stop signal (STP) and the pulse (P).

Numeral 20 designates a motor drive circuit which receives the control signal (C1) or (C2) and outputs drive signals (M1) and (M2). Numeral 21 designates a motor which drives the movable barrel 2 and the focus counter 7. The motor 21 is supplied with the power from a power source 22. The drive signal (M1) and (M2) are transmitted from the motor control circuit 20 to a motor driver 23 which is arranged in such a way that, for example, when the drive signal (M1) is at the level L and the drive signal (M2) is at the level H, the power is supplied to the motor 21 from the power source 22 so as to drive the movable barrel 2 toward the T-position, also similarly when the drive signal (M1) is at the level H and the drive signal (M2) is at the level L, the movable barrel 2 is driven to move toward the W-position, and that when the drive signals (M1) and (M2) are at the level L, the current supply from the power source to the motor 21 is cut so that the motor 21 is nonoperable, also similarly when the drive signals (M1) and (M2) are at the level H, the current supply to the motor is cut and besides the both ends of the motor 21 are short circuited to brake the motor by a solenoid brake function. Numeral 24 designates a central processing unit for controlling each of the above mentioned parts of the device in accordance with a control signal (CTL).

Note that the common contact 9c of the lens barrier switch 9 is connected to each of an end of the push button switches 10, 11 and 12 in parallel with each other. The other end of the push button switch 10 for high speed zooming movement is connected to an input terminal pulled up from the pulse generator circuit 15. Also, the other end of each of the push button switches 11 and 12 is connected to an input terminal pulled up from the switch input circuit 13. Also, an end of the W-position detection switch 5 is connected to an end of a resistance 5a as well as to an input terminal of the stop timing discrimination circuit 17. The other end of the W-position detection switch 5 is grounded to the earth. Similarly, an end of the T-position detection switch 6 is connected to an end of a resistance 6a as well as to an input terminal of the stop timing discrimination circuit 17. The other end of the T-position detection switch 6 is also grounded to the earth. The other ends of the resistances 5a and 6a are connected to a pulled up terminal (PUP) of the stop timing discrimination circuit 17.

Figure 2:
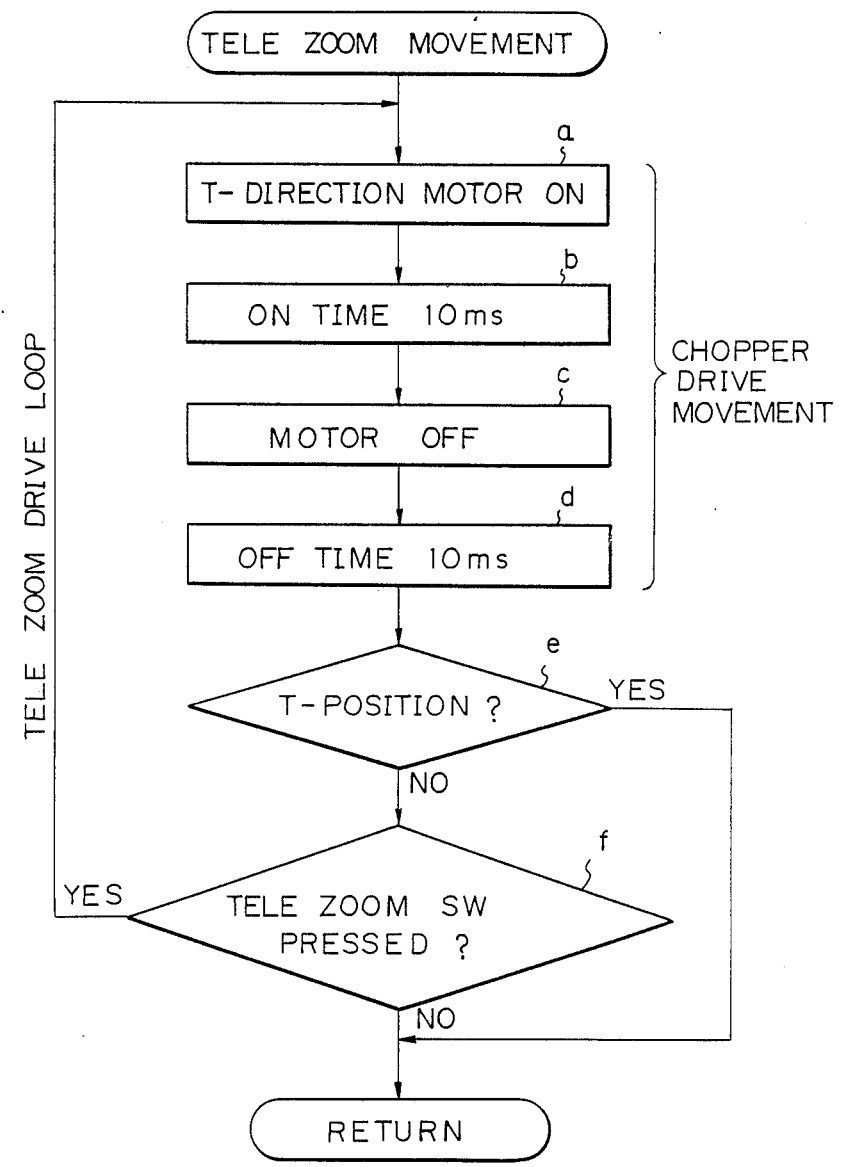
FIG. 2 is a flow chart of a function of the embodiment of FIG. 1, representing a tele-function operated in the normal zooming function.
Figure 3:
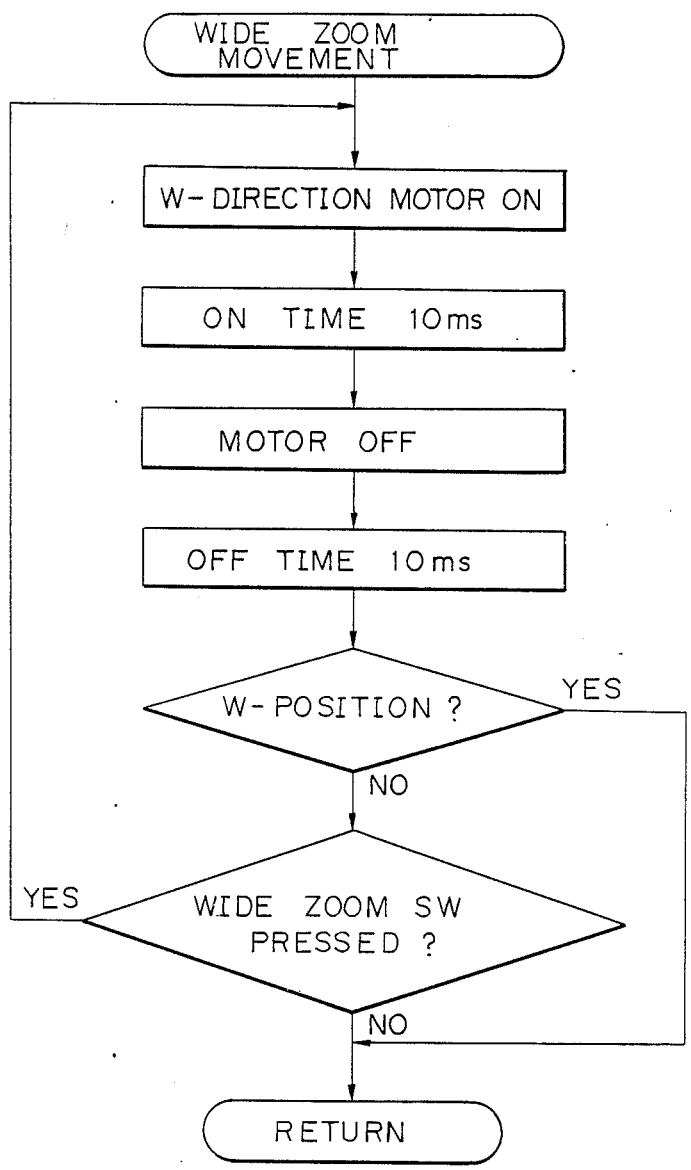
FIG. 3 is another flow chart of a function of the embodiment of FIG. 1, representing a wide function operated in the normal zooming function.

A functional sequence of the device illustrated in FIG. 1 is represented in flow charts of FIGS. 2 to 4. The flow chart of FIG. 2 represents a sequence of a normal zooming movement toward the T-position. The flow chart of FIG. 3 represents a sequence of a normal zooming movement toward the W-position. The flow chart of FIG. 4 represents a sequence of a high speed zooming movement which is a primary feature of the present invention. Each flow chart is explained below along with the explanation of the function of the device in accordance with the present invention.

The function of the above mentioned embodiment of the present invention is as follows. Note that for the sake of easy explanation, it is assumed that each component of the constitution of FIG. 1 is first in an initial state thereof wherein the movable barrel 2 is at the W-position depicted in solid lines and the drive signals (M1) and (M2) and the status signal (STU) are at a level L. Also, it is assumed that, at first, the not shown lens barrier is opened so that the common contact 9c of the lens barrier switch 9 is connected to the opening contact 9a as illustrated in FIG. 1.

First, the movement toward the W-position is described with reference to the flow chart of FIG. 2.

When the user presses the push button switch 12 for focusing an object at a distance, the switch input circuit 13 maintains the level L of the zoom direction signal (ZDR) and raises the status signal (STU) to the level H. The movement represented in the flow chart of FIG. 2 starts from this point. In a step represented as "T-direction motor on" (step a), the normal zooming control circuit 18 outputs the control signal (C1) for driving toward the T-position judging from the zoom direction signal (ZDR) and the status signal (STU). The control signal (C1) is transmitted to the motor control circuit 20 which raises the drive signal (M2) to the level H upon receipt of the control signal (C1). Upon receipt of the drive signal (M2) of the level H, the motor driver 23 connects the power source 22 to the motor 21 in such a way that the motor is driven to rotate in the direction to carry out the zooming movement toward the T-direction. By this rotation of the motor 21, the movable barrel 2 is driven to move toward the T-position and the slit disc plate 7a is rotated. On the other hand, the timer circuit 16 starts the time count function triggered by the edge of the rising portion of the status signal (STU) so as to maintain the state wherein the movable barrel 2 is driven to move toward the T-position for 10 ms.

After the time of 10 ms is passed, the sequence moves to the next step represented as "ON time 10 ms" (step b) in which the timer circuit 16 outputs a time up signal (tm) and starts another subsequent time count function. The time up signal (tm) is transmitted to and received by the normal zoom control circuit 18. The functional sequence moves to the next step represented as "motor OFF" (step c) in which the normal zoom control circuit 18 outputs a control signal (C1) which orders to break the current to the motor 21. This control signal (C1) is transmitted to and received by the motor control circuit 20 which, upon receipt of the control signal, changes the drive signal (M2) to the level L so that the motor driver 23 breaks the current to the motor 21, thus the motor becoming inoperable. This state continues for 10 ms.

After the time of 10 ms is passed, the sequence moves to the next step represented as "OFF time 10 ms" (step d) in which the timer circuit again outputs the time up signal (tm) to the normal zoom control circuit 18. Upon receipt of this time up signal, the normal zoom control circuit 18 discriminates whether the movable barrel is at the T-position or not in the step e, as represented by "T-position ?", in accordance with the information introduced from the stop discrimination circuit 17 through the central processing unit 24. The stop discrimination circuit 17 changes the signal of the pulled up terminal PUP to the level H and then checks the T-position signal (T). At this moment, the T-position switch 6 is still being opened since the state is right after the movable barrel 2 has started to move toward the T-position. Therefore, the stop discrimination circuit 17 does not output the stop signal (STP). Accordingly, the sequence moves along the line NO to the next step represented as "telezooming switch pressed ?" (step f) in which the status signal (STU) is checked.

When the switch 12 for the T-position is still being pressed, the sequence moves along the line YES back to the step a so that the above mentioned function is repeated. The above mentioned function is referred to as "tele zooming drive loop" hereinafter. Also, the function from the step a to the step d is referred to as "chopper drive movement" hereinafter.

In general, a torque for starting to rotate a motor is large. Therefore, the motor 21 requires a large starting torque and does not start to rotate by the first chopper drive movement. The motor 21 starts to rotate from the second chopper drive movement so that the movable barrel 2 starts to move toward the T-position. In response to the movement of the barrel 2, the slit disc plate 7a starts to rotate so that the photointerrupter 7b outputs a pulse signal (Dfc) which is transmitted to the pulse counter 8. Upon receipt of this pulse signal (Dfc), the pulse counter 8 starts to count the pulses and outputs the count signal incremented by one from zero such as (ZP)=0, (ZP)=1, ......, which count signal (ZP) is transmitted to the central processing unit 24 through the normal zoom control circuit 18. The central processing unit 24 reads the count signal and changes the signal to the corresponding focal distance which is displayed by a not shown display.

After that, the user stops the manipulation of the push button switch 12 for telefocusing operation at the moment when he or she finds a desired composition (field angle) in the finder of the camera. This triggers the switch input circuit 13 to change the status signal (STU) to the level L and maintains this level L. With this state, referring back to the flow chart, the sequence moves along the line NO of the above mentioned step f so that the telezooming function is ended. Note that in this state, the motor 21 is always inoperable since the function represented by the line NO of the step f is always takes place after the step "motor OFF" (step c).

In the above mentioned telezooming function, if the telezooming switch 12 is still being pressed after the movable barrel 2 reaches the T-position, the sequence diverges from the step e represented by "T-position ?" along the line YES to the mark "RETURN" to end the telezooming function since the normal zoom control circuit 18 receives the stop signal (STP) from the stop discrimination circuit 17.

On the other hand, in the state where the movable barrel 2 is at the position T, if the telezooming switch 12 is started to be pressed, only the first round of the above mentioned chopper drive movement from steps a to d is carried out and then the sequence diverges the step e to "RETURN" along the line YES to end the sequence. Therefore, the motor is not actually rotated.

With regard to the wide zooming function to move the barrel 2 toward the position W, the sequence of the function is represented in the flow chart of FIG. 3. The wide zooming function sequence is essentially the same as the telezooming function mentioned above except that the direction of the movement is reversed. Therefore, the description thereof is deleted.

The high speed zooming function which is a primary feature of the present invention is described below with reference to the flow chart of FIG. 4.

First, each component of FIG. 1 is assumed to be in the above mentioned initial state. When the user presses the high speed zoom switch 10, the pulse generation circuit 15 outputs a pulse signal (P) at the moment when the switch 10 is pushed irrespective of the length of the time that the switch is being pushed. The pulse signal (P) is transmitted to and received by the high speed zoom control circuit 19. Upon receipt of this pulse signal, the high speed zoom control circuit 19 checks whether the movable barrel 2 is at the position W or not in step g represented as "W-position ?" on the basis of information data introduced from the stop discrimination circuit 17 through the central processing unit 24. That is, the high speed zoom control circuit receives a data signal that the movable barrel 2 is at the position W in accordance with the position signal (W) transmitted from the stop discrimination circuit 17 along with the stop signal (STP). Therefore, the sequence in the flow chart moves along the line YES to the next step h represented as "T-direction motor ON". In this step h, the high speed zoom control circuit 19 drives the motor to rotate at a high speed to move the barrel 2 to the position T through the motor control circuit 20 in the same manner as in the above mentioned telezooming function of FIG. 2. In the next step j represented as "T-position ?", the stop signal (STP) transmitted from the stop discrimination circuit 17 is checked so that the cycle is repeated along the divergent line NO until the position signal (T) is received.

The above mentioned function means that the motor control circuit continues to supply with the current to the motor 21 until the movable barrel 2 is moved from the position W to the position T without interruption instead of intermittently supplying with the current to intermittently drive the motor as in the chopper drive movement of duty ratio 50% in the normal zooming function mentioned above. Therefore, the movable barrel 2 is driven at a speed far faster than the normal speed in the normal zooming function.

When the movable barrel 2 reaches the position T, the stop discrimination circuit 17 transmits the stop signal (STP) informing the receipt of the position signal (T) to the high speed zoom control circuit 19. Upon receipt of this stop signal, the high speed zoom control circuit 19 outputs a control signal (C2) to stop the motor 21 in the subsequent step 1 represented as "motor OFF". Upon receipt of this control signal (C2), the motor control circuit 20 changes the drive signals (M1) and (M2) to the level L so as to make the motor inoperable. After that, the sequence of the flow chart moves to the mark "RETURN" so that the high speed zooming function is ended.

In this state wherein the movable barrel 2 is at the position T, if the high speed zooming switch 10 is again pressed, the high speed zoom control circuit 19, upon receipt of the pulse signal (P), functions to diverge the sequence along the line NO from the step g ("W-position ?") to the step i ("W-direction motor ON") on the basis of the stop signal (STP) which is transmitted from the stop discrimination circuit 17 and informs that the movable barrel 2 is at the position T. In the step i, the high speed zoom control circuit 19 controls the motor control circuit 20 to adjust the motor drive signals so that (M1)=level H, and (M2)=level L so as to drive the motor 21 in the direction that the movable barrel 2 is moved toward the position W. In the next step k represented as "W-position ?", the high speed zoom control circuit 19 repeats the cycle along the line NO so that the motor control circuit 20 continues to supply the motor with the current until the receipt of the signal that informs the movable barrel 2 reaches the position W from the stop discrimination circuit 17.

At the moment when the movable barrel 2 reaches the position W, the sequence moves along the line YES from the step k to the next step 1 "motor OFF" to stop the motor and then to the mark RETURN where the high speed zooming function is ended.

The direction of the movement of the barrel 2 is discriminated only in the first step g "W-position ?" of the flow chart of FIG. 4. That is, when the movable barrel 2 is at any position other than the position W, the barrel 2 is always driven to move toward the position W (the initial position) by the manipulation of the high speed zooming switch 10.

As mentioned above, in accordance with the embodiment of the present invention, the zooming function comprises a normal zooming movement triggered by the zoom switch 14 wherein the motor 21 is driven at a relatively slow speed in a manner of chopping drive of duty ratio 50% during the zoom switch 14 is manipulated and a high speed zooming movement triggered by the high speed zooming switch 10 wherein the motor 21 is automatically driven at a speed far faster than the normal zooming speed from the position W to the position T or from any position other than the position W to the position W by continuously supplying the motor with an electric current in a manner of duty ratio 100% irrespective of the length of the manipulation time of the high speed zooming switch 10. Therefore, it is unnecessary to keep pressing the push button switch during the zooming movement as was the case of the prior art structure and it becomes possible to operate the high speed zooming movement by a one touch manipulation of the push button switch and change the image of field from the T-position to the W-position and vice versa far more quickly than the prior art structure.

Also, in accordance with the above mentioned embodiment of the present invention, it is possible to make a fine adjustment of the zooming position at a relatively slow speed by the function of the normal zooming movement. Therefore, the advantages of the normal speed zooming function is not impaired.

Also, it is not apt to mismanipulate the high speed zooming switch 10 since it comprises only one push button in comparison to the prior art zooming switch comprising two push buttons for the telezooming movement and the wide zooming movement, respectively. Besides, if the movable barrel 2 is stopped at a middle point between the position T and the position W due to a mismanipulation of the zooming switch 14, it is possible to shift the zooming position to the wide field initial position (W-position) at a high speed by a one touch manipulation to only push the button. Therefore, it is easy to handle the camera for a person who is not skilled in operating the zooming function, by using the camera as an easy operable two focal point camera, thus avoiding misshots due to inexperience of the camera.

Note that the present invention is not limited to the above mentioned embodiment and can be modified to various variants within the scope of the invention.

For instance, with regard to the function "motor OFF" in the flow chart of FIG. 4, the motor may be braked by adjusting the motor drive signals (M1) and (M2) to be the level H, instead of making the motor driver circuit 23 inoperable.

Also, the pulse counter 8, the normal zoom control circuit 18 and the central processing unit 24 may be constituted by a microcomputer having an interruption means so that the interruption means counts the output pulses (Dfc) to detect the focal length.

Also, the setting time of the timer 16 is not limited to 10 ms and the duty ratio of the chopping drive movement is not limited to 50%. The setting time and the duty ratio may be changed in accordance with the structure of the motor 21 and the movable barrel 2.

As mentioned in detail above, the zoom lens drive control device in accordance with the present invention comprises a first zooming means comprising a first trigger means for starting a first zooming function wherein the focal length of the zoom lens is continuously changed at a relatively slow normal speed during the first trigger means is manipulated and a second zooming means comprising a second trigger means for starting a second zooming function wherein the focal length of the zoom lens is quickly arranged to the maximum focal position or to the minimum focal position at a speed far higher than the normal zooming speed at the moment of manipulation of the second trigger means irrespective of the length of the manipulation time thereof. Therefore, in accordance with this structure, it becomes possible to easily and quickly arrange the focal length of the zoom lens to the maximum focal position or the minimum focal position by a simple manipulation of the second trigger means for carrying out the second zooming function.

Many widely different embodiments of the present invention may be constructed without departing from the spirit and scope of the present invention. It should be understood that the present invention is not limited to the specific embodiments described in the specification, except as defined in the appended claims.

What is claimed is:

1. A control device for driving a zoom lens of a camera comprising:

a zoom lens arranged on an optical axis;

a drive means for driving the zoom lens along the optical axis;

a first control means for controlling a first zooming function of the camera in such a manner that the zoom lens is moved at a relatively slow normal speed by the drive means to thereby continuously change a focal point of the zoom lens;

a first actuating means for actuating the first control means only during the time when the first actuating means is being manipulated;

a focal distance detection means for detecting a position of the zoom lens on the optical axis, said position corresponding to the focal distance of the zoom lens;

a maximum focal position detection means for detecting a longest distance state where the zoom lens is positioned at a position corresponding to a maximum focal point on the optical axis and for outputting a signal of the maximum focal position corresponding to the longest distance state;

a minimum focal position detection means for detecting a shortest distance state where the zoom lens is positioned at a position corresponding to a minimum focal point on the optical axis for outputting a signal of the minimum focal position corresponding to the shortest distance state;

a second control means for controlling a second zooming function of the camera in such a manner that the zoom lens is moved at a speed far faster than the normal speed by the driving means to the maximum focal position or to the minimum focal position and stopped at the time when the second control means receives the outputted signal of the maximum focal distance or the minimum focal distance; and a second actuating means for actuating the second control means in such a manner that the zoom lens is automatically moved to the maximum focal position or to the minimum focal position irrespective of time period during which the second actuating means is being manipulated, when the second actuating means is manipulated.

2. A control device for driving a zoom lens of a camera according to claim 1, wherein the first actuating means comprises a telezooming push button switch used in the moving of the zoom lens to the maximum focal position and a wide zooming push button switch used in the moving the zoom lens to the minimum focal position.

3. A control device for driving a zoom lens of a camera according to claim 1, wherein the zoom lens is secured to a movable barrel slidably installed in a stationary barrel which has a first stopper for stopping the movable at the maximum focal position and a second stopper for stopping the movable barrel at the minimum focal position and each of the maximum focal position detection means and the minimum focal position detection means comprises a switch which detects that the movable barrel abuts against corresponding one of the first stopper and second stopper.

4. A control device for driving a zoom lens of a camera according to claim 1, wherein the second actuating means comprises one push button switch used in the moving of the zoom lens from any position other than maximum focal position to the maximum focal position or from any position other than the minimum focal position to the minimum focal position.

5. A control device for driving a zoom lens of a camera according to claim 1, wherein the driving means comprises a motor, and the first control means is arranged in such a manner that the motor is intermittently supplied with an electric current at a predetermined interval preset by a timer means.

6. A control device for driving a zoom lens of a camera according to claim 1, wherein the driving means comprises a motor, and the second control means is arranged in such a manner that the motor is continuously supplied with an electric current until the zoom lens reaches the maximum focal position or the minimum focal position.--

* * * * *